UNITED STATES PATENT OFFICE.

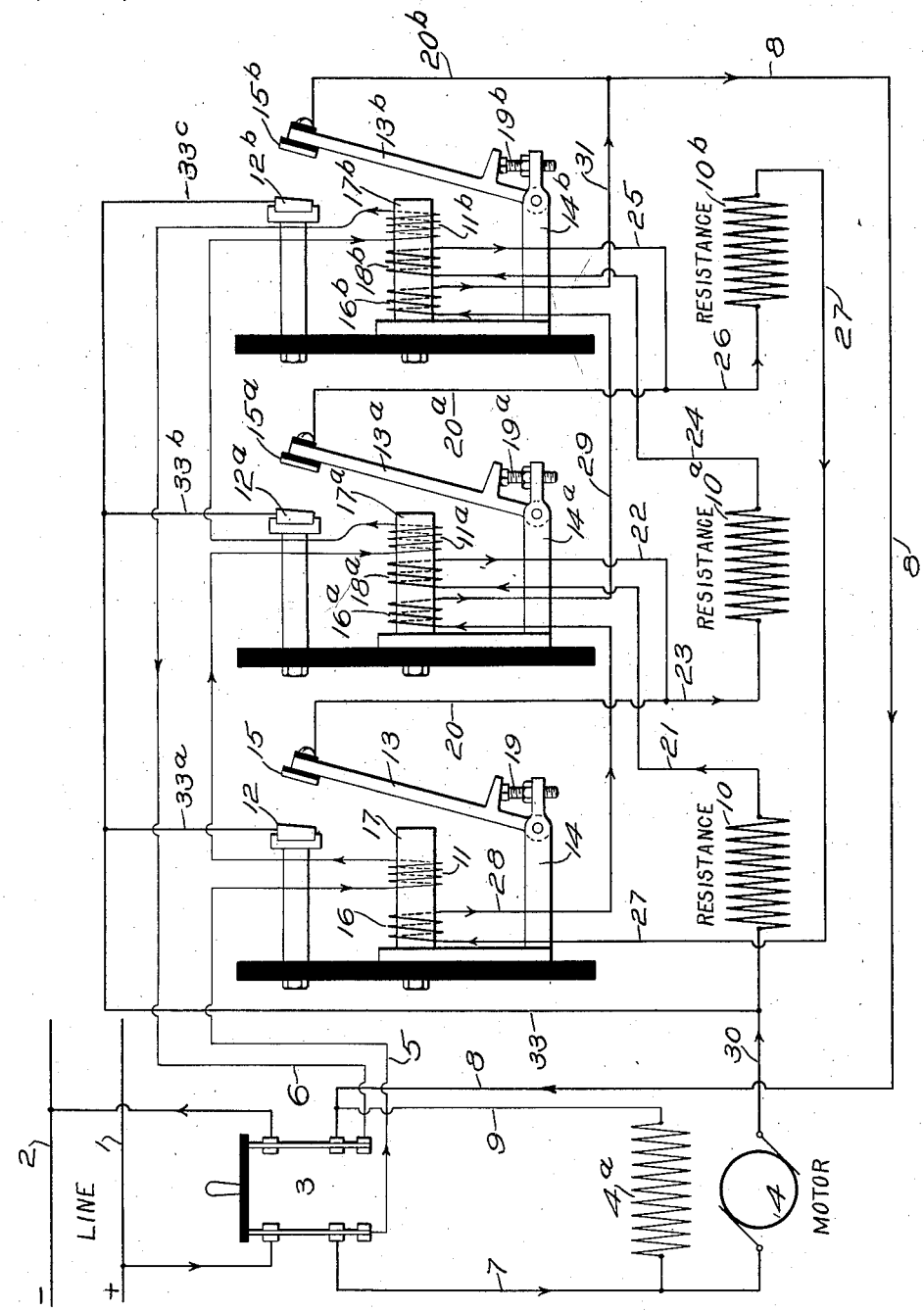

WILLIAM S. SMITH, OF CAMBRIDGE, MASSACHUSETTS.

STARTING AND ACCELERATING DEVICE FOR MOTORS.

1,167,946.  Specification of Letters Patent.  Patented Jan. 11, 1916.

Application filed April 19, 1912. Serial No. 691,971.

*To all whom it may concern:*

Be it known that I, WILLIAM S. SMITH, a citizen of the United States, and resident of Cambridge, in the county of Middlesex and Commonwealth of Massachusetts, have invented new and useful Improvements in Starting and Accelerating Devices for Motors.

My invention relates to that class of accelerating devices for motors in which the starting resistances interposed in the armature or motor circuit are cut out in successive steps by electro-magnets.

My device is particularly applicable to motors used for operating elevators, but it is obvious that it can be applied to any electric motor.

My object has been to provide a device by means of which the several sections of resistance interposed in the armature circuit are automatically successively cut out as the speed of the armature increases, by means of magnets energized from a shunt-circuit of comparatively high resistance having a practically constant flow of current, the adjustment and operation of said magnets being such that a current greater than a predetermined value cannot pass through the armature-circuit under normal conditions, during the interval of starting the motor. I have illustrated and described my device as having three such resistances interposed in the armature-circuit and with proper connections for the successive cutting out of these several resistances. It is obvious, however, that my invention is adapted for use in connection with either a larger or smaller number of such resistances and is capable of such adjustment that the strength of the several resistances may all be alike or different as occasion requires and the rate of cutting out such resistances can be adjusted at pleasure.

The accompanying drawing is a diagrammatic view embodying the features of my invention.

1 and 2 represent the positive and negative lines of a main supply or primary circuit.

3 is a switch for closing the circuit to the motor and its connections and the shunt-circuit hereinafter referred to, and may, if desired, have contacts so that the direction of rotation of the motor may be reversed at the will of the operator. It may also have other contacts for closing other and auxiliary circuits necessary for the use to which the motor is put. I have purposely shown the most simple form of switch with separate contacts, in order that the features embodied in my invention may be more readily understood.

4 is an electric motor shown as a shunt-motor with shunt-field $4^a$, but it will be understood that my invention is applicable as well to a motor having a series winding or a compound winding.

5 and 6 are the positive and negative lines of a shunt-circuit of comparatively high resistance and connected with the main circuit by means of switch 3. It will be observed that this circuit has a current of practically constant value.

7 and 8 are the positive and negative lines of a main or armature-circuit which is connected with the main supply circuit by means of switch 3.

7 and 9 are the positive and negative lines of a shunt-circuit of an electric motor passing through shunt-field $4^a$ and are also connected with the main line by switch 3.

10, $10^a$, $10^b$ are resistances interposed in the main or armature-circuit.

11, $11^a$, $11^b$ are magnet-coils interposed in the shunt-circuit 5—6 and respectively wound on magnet-cores 17, $17^a$, $17^b$. These magnet-coils, 11, $11^a$, $11^b$, are illustrated as being connected in series, but it is obvious that the same result herein described and claimed may be accomplished by other well-known methods, such for instance as connecting said magnet-coils in parallel or by utilizing a single magnet having one coil with several magnet-cores.

12, $12^a$, $12^b$ are contacts respectively connected by wires 33, $33^a$, $33^b$, $33^c$ with line 30 of the armature-circuit.

13, $13^a$, $13^b$ are arms respectively movably mounted on posts 14, $14^a$, $14^b$ and are preferably constructed of magnetic material so as to be attracted by magnet-cores 17, $17^a$, $17^b$ when the same are properly energized. I do not, however, limit myself to the precise construction shown, as it would be perfectly feasible to have the arms constructed of nonmagnetic or insulating material with a plate or other attachment of magnetic material affixed thereto in position to be operated on by said magnets. There is, however, an advantage in the construction which I have illustrated, which consists in having the magnet and post supporting the movable arm and the arm itself constructed of magnetic material for the reason that it facilitates the operation of said movable arms when said magnets are energized by setting up a magnetic flux between said magnet-cores and said arms. These arms 13, 13$^a$, 13$^b$ respectively carry contacts 15, 15$^a$, 15$^b$, which are respectively insulated from said arms and electrically connected as hereinafter described.

16, 16$^a$, 16$^b$ represent coils of comparatively low resistance respectively wound on magnet-cores 17, 17$^a$, 17$^b$. Said last mentioned magnet coils are here shown connected in series and the direction of the current flowing in these coils 16, 16$^a$, 16$^b$ is such as to oppose the magnetic flux set up by coils 11, 11$^a$, 11$^b$. 18$^a$ and 18$^b$ are other coils of comparatively low resistance wound respectively on the magnet-cores 17$^a$, 17$^b$.

19, 19$^a$, 19$^b$ are adjustment screws preferably made of some nonmagnetic material and adapted to adjust the air gaps between magnet-cores 17, 17$^a$, 17$^b$ and the movable arms 13, 13$^a$, 13$^b$. Wire 20 connects contact 15 with the armature-circuit, intermediate coil 18$^a$, and resistance 10$^a$. Wire 20$^a$ connects contact 15$^a$ with the armature-circuit, intermediate-coil 18$^b$, and resistance 10$^b$. Wire 20$^b$ connects contact 15$^b$ with the armature-circuit, intermediate resistance 10$^b$, and line 8.

I preferably connect contact 15$^b$, intermediate coils 16, 16$^a$, 16$^b$, and line 8 so that when arms 13, 13$^a$, 13$^b$ have performed their functions and 10, 10$^a$, 10$^b$ have been cut out, the coils 16, 16$^a$, 16$^b$ will also be short-circuited. Following out the armature-circuit from line 1 it passes by means of switch 3 and wire 7 to the armature 4, thence through the armature of the motor and by means of wire 30 to resistance 10, thence through resistance 10, wire 21, coil 18$^a$, wire 22, wire 23, resistance 10$^a$, wire 24, coil 18$^b$, wire 25, wire 26, resistance 10$^b$, wire 27, coil 16, wire 28, coil 16$^a$, wire 29, coil 16$^b$, wire 31, wire 8 and switch 3 to line wire 2.

The operation of my invention is as follows: Assuming the main line to be closed by switch 3, the current flows from wire 1 through switch 3, wire 5, magnet coils 11, 11$^a$, 11$^b$ and returns by wire 6 and switch 3 to the negative side of the line represented by wire 2. The flow of such current being of practically constant value causes the coils 11, 11$^a$, 11$^b$ to exert a practically constant pull on arms 13, 13$^a$, 13$^b$ because of the magnetization these coils set up and maintain in cores 17, 17$^a$, 17$^b$ so long as switch 3 remains closed. The arms 13, 13$^a$, 13$^b$ are preferably of such material as to be attracted by the magnets 17, 17$^a$, 17$^b$ when said magnets are energized by coils 11, 11$^a$, 11$^b$, but the mehanical construction and adjustment of said arms is such as to have sufficient space between said arms and said magnets to prevent the attraction of said arms until the operation of the armature of the motor 4, which is assumed to have commenced to rotate because of the rush of current, taking place when switch 3 is closed, has developed sufficient counter-electro-motive-force to weaken the current flowing in the armature-circuit and coils 18$^a$, 18$^b$, 16, 16$^a$, 16$^b$ to such an extent that the magnetic flux set up by coil 16 in opposition to that set up by coil 11 is no longer sufficient to prevent the attraction of arm 13 by core 17. Arm 13 now moves over and 15 contacts with 12 short-circuiting resistance 10 and with it coil 18$^a$ and the armature-current now passes from the armature through wire 30, wire 33, contact 12, contact 15, wire 20, wire 23 to resistance 10, because the resistance of this path is much less than that through resistance 10 and coil 18$^a$. It will be observed that when the current in coil 16 has become weakened to such an extent as to allow core 17 to attract arm 13 the current in coils 16$^a$ and 16$^b$ has also been weakened to the same extent, but the arms 13$^a$ and 13$^b$ do not move over because the coils 18$^a$ and 18$^b$ are at this stage working in conjunction with coils 16$^a$ and 16$^b$ to reduce the magnetization set up by coils 11$^a$ and 11$^b$. The resistance 10 and coil 18$^a$ having been short-circuited by contacts 15 and 12 the current in the armature-circuit immediately increases to such an extent that this armature current which is now also passing through coil 16$^a$ and magnetizing core 17$^a$ in opposition to coil 11$^a$ is sufficient to prevent the movement of arm 13$^a$ until such time as the counter-electro-motive-force, generated by the armature, causes the current in coil 16$^a$ again to reduce to a point where the magnetization set up by coil 11$^a$ will attract arm 13$^a$ and cause 15$^a$ and 12$^a$ to come in contact, thus short-circuiting resistance 10$^a$ and coil 18$^b$. The current again immediately rises in the armature-circuit so that this increased current working through coil 16$^b$ in opposition to coil 11$^b$ prevents the movement of arm 13$^b$ until the current again drops and weakens coil 16$^b$ enough to allow core 17$^b$ to act on arm 13$^b$. Arm 13$^b$ now moves over and 15$^b$ contacts with 12$^b$ short-circuiting resistance 10$^b$ and coils 16, 16$^a$, 16$^b$, putting the armature directly across the line. It is not, however, necessary that the coils 16, 16$^a$, 16$^b$ be so connected to the armature-circuit as to be short-circuited upon the operation of the last of the movable arms. There is, of course, an advantage in having them so connected for the reason that it allows a stronger pull to be exerted by the magnets in consequence of the energy derived from the shunt-circuit 5—6 and also prevents heating, which would otherwise be incident to the constant flow of current through coils 16, 16$^a$, 16$^b$. When the arms 13, 13ª, 13ᵇ have been attracted by magnets 17, 17ª, 17ᵇ so as to cause contacts 12 and 15, 12ª and 15ª, 12ᵇ and 15ᵇ respectively to come into contact, the current through the armature-circuit passes from line 1, switch 3, line 7, motor 4, wires 30, 33, 33ᶜ, 20ᵇ and 8 back to switch 3 and thence to line 2.

In my apparatus as I have here illustrated it, the operation of switch 3 to disconnect main lines 1 and 2 from the armature and shunt-circuits and thus deënergize magnets 17, 17ª and 17ᵇ, will cause the arms 13, 13ª, 13ᵇ to operate by gravity and resume the positions indicated in the drawing. I have not considered it necessary to illustrate or describe any means for facilitating this return movement of said arms, it being obvious that if it be necessary or desirable to do so, any well-known means may be adopted to accomplish that result. In actual operation it has been found sufficient to allow such arms to drop by gravity.

What I claim and desire to secure by Letters Patent is:—

1. The combination with a motor, of resistance in the armature circuit, a shunt circuit, a series of magnets each having a coil connected in the shunt circuit and a coil connected in the armature circuit, an additional coil in the armature circuit on each except the first of said magnets, all coils in the armature circuit being similarly wound, but differentially wound from the coils in the shunt circuit, a series of contacts, one operated by each of said magnets, to cut out a section of resistance in the armature circuit and simultaneously therewith a magnet coil in the armature circuit on the magnet next succeeding the magnet which has caused a contact to operate, and means to short circuit all said coils in the armature circuit when the last magnet operates.

2. The combination with a motor, of resistance in the armature circuit, a shunt circuit, a series of magnets each having a coil connected in the shunt circuit and a coil connected in the armature circuit, an additional coil on all but one of said magnets and connected in the armature circuit, all coils in said armature circuit being similarly wound but differentially wound from the coils in the shunt circuit and contacts operated by said magnets, so connected in the armature circuit as to cut out a section of resistance and a coil in the armature circuit on the magnet next succeeding the magnet which has caused a contact to operate when the current of the armature circuit reaches a predetermined value and to cut in such resistance and such coils in the armature circuit if the current of the armature circuit afterward goes higher than another predetermined value.

3. The combination of an electric motor, resistance in the armature circuit, a plurality of magnets energized from a shunt circuit, a coil on one of said magnets connected in the armature circuit so as to oppose the operation of said magnet, a plurality of coils on another magnet connected in the armature circuit so as to oppose the operation of said last-mentioned magnet, and means for short-circuiting a section of such resistance and a coil connected in the armature circuit on the magnet having a plurality of such coils when the current of the armature circuit drops to a predetermined value.

4. The combination of an electric motor, resistance in the armature circuit, a plurality of magnets energized from a shunt circuit, a coil on one of said magnets and connected in the armature circuit so as to oppose and prevent the operation of said magnet until the current in the armature circuit drops to a predetermined value, a plurality of coils on another magnet and connected in the armature circuit so as to oppose and prevent the operation of said last-mentioned magnet until said first-mentioned magnet has operated, and contacts controlled by said magnets and so connected in the armature circuit as to cut out a section of resistance and a coil in the armature circuit on the magnet having the plurality of coils when the current in the armature circuit has dropped to such predetermined value.

5. In combination, an electric motor, resistance in the armature circuit, a plurality of contacts connected with, and arranged to cut resistance out of the armature circuit, step by step, when actuated by said magnets, a coil on each of said magnets, connected in the armature circuit to oppose the operation of said magnets, an additional coil on all but one of said magnets and connected in the armature circuit to further oppose the operation of any magnet having such additional coil, until the next preceding magnet has operated.

6. In combination, a motor, resistance in the armature circuit, a magnet energized by a shunt circuit, a movable member controlled by said magnet and connected with the armature circuit so as to short-circuit a section of said resistance and a coil in the armature circuit on the next succeeding magnet when said movable member is actuated by said first-mentioned magnet, a coil on said first-mentioned magnet connected in the armature circuit to oppose the operation of said first-mentioned magnet until the current in the armature circuit has dropped to a predetermined value, another magnet energized by said shunt circuit, a movable member controlled by said last-mentioned magnet and connected with the armature circuit so as to short-circuit another section of said resistance when actuated by said last-mentioned magnet and a plurality of coils on said last-mentioned magnet so connected in the armature circuit as to prevent the operation of said last-mentioned magnet until said first-mentioned magnet has operated and to allow said last-mentioned magnet to operate when the current in the armature circuit has again dropped to a predetermined value.

7. The combination of an electric motor, resistance in the armature circuit, a shunt circuit, a plurality of magnets, a coil on each of said magnets connected in the shunt circuit, a coil on each of said magnets connected in the armature circuit, an additional coil on all but one of said magnets and connected in the armature circuit, all said coils in said armature circuit being similarly wound, but differentially wound from the coils in the shunt circuit, means controlled by said magnets to short-circuit a section of armature resistance together with a coil in the armature circuit on the magnet next succeeding the magnet in operation, and means to short-circuit all the coils in the armature circuit on said magnets when the last of said magnets operates.

8. The combination of an electric motor, resistance in the armature circuit, a plurality of magnets constantly energized from a shunt circuit, a coil on each of said magnets connected in the armature circuit, an additional coil on all but one of said magnets also connected in the armature circuit, and a contact for and operated by each magnet, said coils in the armature circuit being differentially wound from the coils in the shunt circuit and all said coils and said contacts being so arranged and connected that said magnets will be caused to operate successively, as the current of the armature circuit drops, to cut out a section of resistance and one coil in the armature circuit on the magnet next succeeding the magnet which has operated.

9. The combination of an electric motor, resistance in the armature circuit, a plurality of magnets constantly energized from a shunt circuit, a coil on one of said magnets and connected in the armature circuit so as to oppose and prevent the operation of said magnet until the current of the armature circuit drops to a predetermined value, a plurality of coils on the other of said magnets, all said coils on said last-mentioned magnet being connected in the armature circuit so as to oppose and prevent the operation of said last-mentioned magnet until said first-mentioned magnet has operated, and contacts controlled by said magnets and so connected in the armature circuit as to cut out a section of resistance and a coil in the armature circuit on the magnet having the plurality of coils when the current in the armature circuit has dropped to such predetermined value but to leave in operation the other coil on said last mentioned magnet and the coil on said first-mentioned magnet.

10. The combination of an electric motor, resistance in the armature circuit, a plurality of magnets energized from a shunt circuit, a coil on each of said magnets connected in the armature circuit, an additional coil on all but one of said magnets also connected in the armature circuit, contacts operated, one by each of said magnets, and so connected in the armature circuit that the operation of a magnet will cut out a section of resistance and a coil on the next succeeding magnet when the current of the armature circuit drops to a predetermined value and all said coils in the armature circuit will be short-circuited when the last magnet operates.

In witness whereof, I have hereunto set my hand in the presence of two subscribing witnesses, this the thirteenth day of April, 1910.

WILLIAM S. SMITH.

Witnesses:
V. GLADYS STOWE,
FRANK B. FLINT.